United States Patent [19]

Taki

[11] Patent Number: 4,855,986

[45] Date of Patent: Aug. 8, 1989

[54] DATA STORAGE AND READOUT OPTICAL HEAD USING A SINGLE SUBSTRATE HAVING AN ELECTROOPTIC CONVERGING PORTION FOR ADJUSTMENT OF THE LIGHT BEAM FOCAL POINT

[75] Inventor: Kazunari Taki, Nagoya, Japan

[73] Assignee: Brother Kogyo Kabushiki Kaisha, Aichi, Japan

[21] Appl. No.: 829,065

[22] Filed: Feb. 13, 1986

[30] Foreign Application Priority Data

Feb. 16, 1985 [JP] Japan .................. 60-28972

[51] Int. Cl.$^4$ .................. G11B 7/135; G02B 6/12
[52] U.S. Cl. .................. 369/112; 350/96.12; 350/96.14; 350/96.18; 369/44; 369/45
[58] Field of Search .................. 369/100–112, 369/120–122, 44, 45; 350/96.11, 96.14, 96.18, 96.19

[56] References Cited

U.S. PATENT DOCUMENTS

| 3,795,433 | 3/1974 | Channin ............................ 350/96.14 |
| 4,070,092 | 1/1978 | Burns ............................... 350/96.14 |
| 4,175,827 | 11/1979 | McMahon ....................... 350/96.14 |
| 4,348,079 | 9/1982 | Johnson ........................... 350/358 |
| 4,413,270 | 11/1983 | Sprague .......................... 346/160 |
| 4,425,023 | 1/1984 | Matsumoto et al. ............ 350/96.14 |
| 4,470,661 | 9/1984 | Matsumoto . |
| 4,478,483 | 10/1984 | Sprague .......................... 350/96.14 |
| 4,548,464 | 10/1985 | Auracher et al. ................ 350/96.14 |
| 4,637,681 | 1/1987 | Yamamoto et al. ............. 350/96.12 |
| 4,747,090 | 5/1988 | Yamashita et al. .............. 369/112 |

FOREIGN PATENT DOCUMENTS

| 0021510 | 1/1981 | European Pat. Off. . |
| 0021993 | 1/1981 | European Pat. Off. . |
| 0048441 | 3/1982 | European Pat. Off. . |
| 3102972 | 11/1981 | Fed. Rep. of Germany . |
| 51-8949 | 1/1976 | Japan .......................... 358/300 |
| 54-150153 | 11/1979 | Japan . |
| 58-125025 | 7/1983 | Japan . |
| 58-147718 | 9/1983 | Japan . |
| 59-204027 | 11/1984 | Japan . |

OTHER PUBLICATIONS

Takizawa, *Electro-Optic Fresnel Lens-Scanner with an Array of Channel Waveguides*, Applied Optics, vol. 22, No. 16, Aug. 15, '83, pp. 2468–2473.

Matsunaga et al., "Optical Waveguide Isolator in Tidiffused Linbo$_3$", *Optics Communications*, Dec. 1978, vol. 27, No. 3, pp. 361–364.

Tsao et al., "Photodeposition of Ti and Application to Direct Writing of Ti: Linbo$_3$ Waveguides", *Appl. Phys. Lett.*, vol. 42, No. 7, Apr. 1983, pp. 559–561.

Primary Examiner—Alan Faber
Assistant Examiner—James E. Tomassini
Attorney, Agent, or Firm—Oliff & Berridge

[57] ABSTRACT

An optical head for optical storage and readout of information on or from an optical recording medium using a light beam comprises a single substrate having a waveguide on one of its opposite surfaces, a deflector portion disposed on the substrate to deflect the light beam passing through the waveguide at an adjustable angle, and a converging portion for converging the light beam to be emitted from the waveguide. The converging portion comprises a plurality of convergence electrodes which are disposed on a part of the waveguide. The convergence electrodes are spaced apart from each other in a direction perpendicular to the direction of propagation of the light beam through the part of the waveguide such that the part of the waveguide possesses, as a consequence of an electrooptic effect, a distribution of refractive index which permits adjustment of the focal point of the converged light beam.

7 Claims, 4 Drawing Sheets

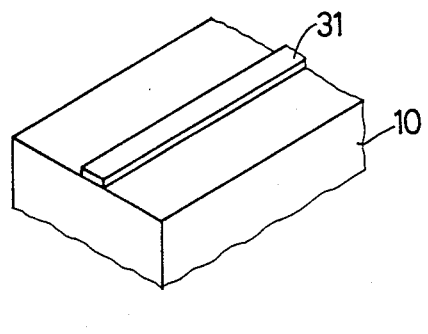
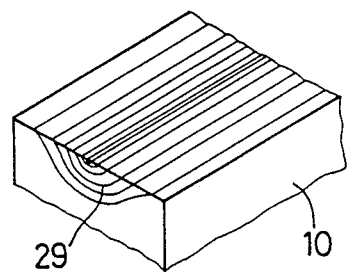
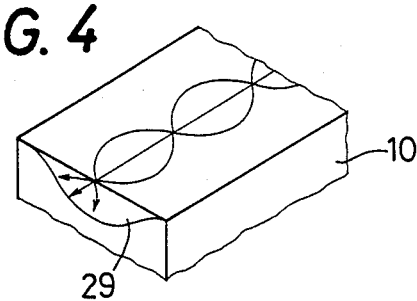
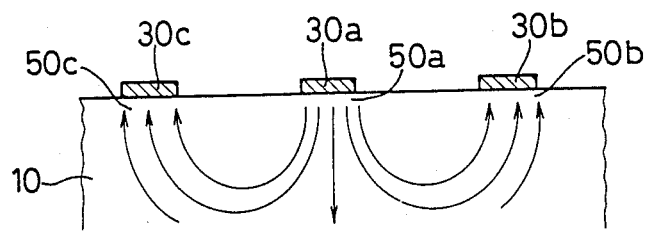

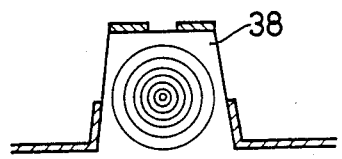
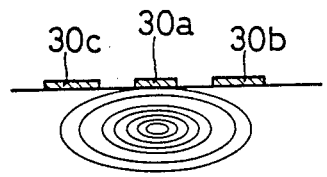
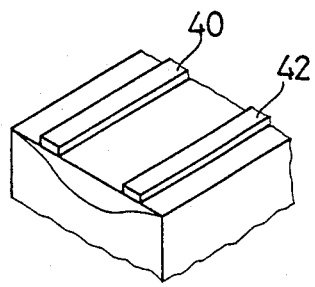
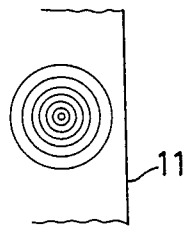
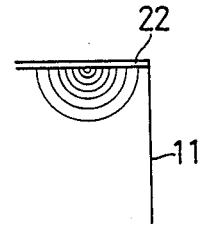
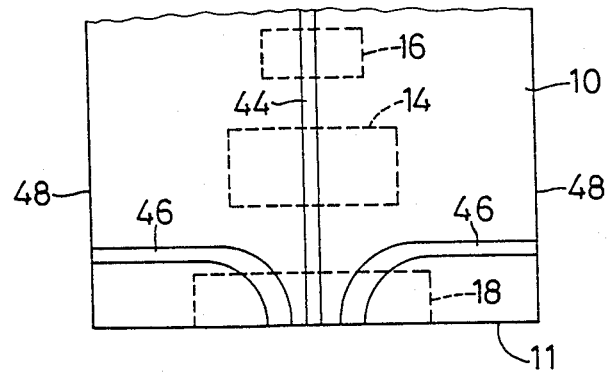

DATA STORAGE AND READOUT OPTICAL HEAD USING A SINGLE SUBSTRATE HAVING AN ELECTROOPTIC CONVERGING PORTION FOR ADJUSTMENT OF THE LIGHT BEAM FOCAL POINT

BACKGROUND OF THE INVENTION

1. Field of the Art

The present invention relates to an optical head used for an optical recording apparatus.

2. Related Art Statement

An optical head is known, which emits a light beam toward an optical recording medium, for storing information on the recording medium, or reproducing information stored on the recording medium. For example, an optical head employs an optical system for directing a laser beam from a laser source to a recording track on an optical or magneto-optical recording disk, and/or for receiving and sensing a light beam reflected from the recording track. The optical system includes an object lens for focusing the laser beam on the surface of the recording disk, and a tracking mirror for deflecting the laser beam so as to position the spot of the laser beam at the center of a recording track of the disk.

3. Problem Solved by the Invention

However, there are various factors which cause a variation in the position of a recording disk relative to the focal point of a beam emitted from an optical head. More specifically, the positions of the recording tracks of the disk may be varied in a direction parallel to the optical axis of the optical head and in a direction perpendicular to the optical axis. To compensate for this positional variation, the focal point of the optical system should be adjusted in both directions indicated above. To this end, a known optical head of the type indicated above incorporates a device for moving the object lens along the optical axis, and a device for changing the angular position of the tracking mirror. If a tracking mirror is not employed, the optical head requires a device for moving the object lens in the direction perpendicular to the optical axis. Therefore, the conventional optical head incorporating such driving devices tends to be heavy, large-sized and complicated in structure. Therefore, the conventional optical head is not satisfactory in its access speed. Further, the use of a relatively large number of optical components leads to increased loss of light during propagation through the optical system. Moreover, the optical components must be aligned with each other with high precision, which makes it difficult to assemble the optical head.

SUMMARY OF THE INVENTION

It is accordingly an object of the present invention to provide an optical head, which is comparatively light-weight and simple in construction, and which permits fast and accurate focusing of a light beam at a predetermined point on an optical recording medium.

According to the present invention, there is provided an optical head for optical storage and readout of information on or from an optical recording medium, by means of emission of a light beam, comprising: (a) a single substrate having a waveguide on one of its opposite surfaces; (b) a deflector portion disposed on the substrate to deflect the light beam passing through the waveguide, at an adjustable angle; and (d) a converging portion for converging the light beam to be emitted from the waveguide, the converging portion comprising a plurality of convergence electrodes which are disposed on a part of the waveguide, the plurality of convergence electrodes being spaced apart from each other in a direction perpendicular to a direction of propagation of the light beam through the above-indicated part of the waveguide, such that this part of the waveguide possesses, as a consequence of an electro-optic effect, a distribution of refractive index which permits adjustment of a focal point of the converged light beam.

In the optical head of the invention constructed as described above, the light beam passing through the waveguide is deflected at a suitable angle by the deflector portion provided integrally on the substrate, and the deflected light beam is converged by the converging portion also provided integrally on the substrate. Further, the focal point of the converged light beam is adjusted by the distribution of refractive index established by the convergnece electrodes. With this arrangement, a possible variation in the axial and radial positions of the recording medium relative to the optical head may be compensated for by the deflection of the light beam by the deflector portion, and by the focusing adjustment of the converged light beam by the converging portion. In other words, the instant optical head is capable of adjusting the positions of the beam spot in a direction parallel to the optical axis of the optical head and in a direction perpendicular to the optical axis. Hence the optical head according to the invention does not require a device for moving an object lens along its optical axis, and a device for changing an angular position of a tracking mirror or a device for moving the object lens perpendicularly to its optical axis. Consequently, the size and weight of the optical head are significantly reduced, whereby the speed of positioning the beam spot at a target on the recording medium is improved, with a resulting increase in the access speed of the optical head. Further, the present optical head uses a considerably reduced number of optical components, as compared with the conventional counterpart. This reduction in the number of components results in a correspondingly reduced loss of the light energy during propagation through the optical system. Furthermore, the fewer number of optical components means that assembly of the optical head is easier and that the cost of manufacture is reduced.

According to one advantageous embodiment of the invention, the deflector portion comprises an oscillator which generates elastic surface waves to which another part of the waveguide is exposed, so that a refractive index of the another part of the waveguide is periodically varied at a frequency corresponding to a frequency of the elastic surface waves, to diffract the light beam at a varying angle, whereby the angle of deflection of the light by the deflector portion is varied as the frequency of the elastic surface waves is changed.

According to another advantageous embodiment of the invention, the deflector portion comprises a plurality of deflection electrodes disposed on another part of the waveguide. The deflection electrodes are spaced apart from each other such that the above-indicated another part of the waveguide possesses, as a consequence of an electro-optic effect, a distribution of refractive index corresponding to a distribution of magnitude of an electric field produced by the deflection electrodes. Therefore, the distribution of magnitude of the electric field is varied as a function of time, to thereby vary the angle of deflection of the light beam by the deflector portion.

In accordance with a further advantageous embodiment of the invention, the converging portion comprises a first converging portion including a plurality of first convergence electrodes disposed on a first section of the above-identified part of the waveguide, and a second converging portion including two second convergence electrodes disposed in parallel on a second section of the above part of the waveguide which is adjacent to an end of the substrate from which the light beam is emitted. In this embodiment, the plurality of first convergence electrodes are spaced apart from each other in a direction perpendicular to a line of propagation of the light beam through the first section of the waveguide, such that the first section possesses, as a consequence of an electro-optic effect, a distribution of refractive index which causes the light beam to be converged in a direction parallel to the one surface of the substrate. In the meantime, the two second convergence electrodes are arranged so as to extend perpendicularly to the direction of propagation of the light means, and are spaced from each other in the direction of propagation such that the second section possesses, as a consequence of an electro-optic effect, a distribution of refractive index which causes the light beam to be converged in a direction of thickness of the substrate.

In one preferred form of the above embodiment, one of the second convergence electrodes is disposed on a top surface of the second section of the part of the waveguide, while the other second convergence electrode is disposed on an end face of the second section from which the light beam is emitted.

In another preferred form of the above embodiment, the first section of the part of the waveguide has a distribution of refractive index which permits the light beam to be converged at least in the direction parallel to the one surface of the substrate, while the second section of the part of the waveguide has a distribution of refractive index which causes the light beam to be converged in the direction of thickness of the substrate. In this case, the first section of the part of the waveguide may be provided as a ridge formed on the previously indicated one surface of the substrate.

According to a still further embodiment of the invention, the converging portion comprises a first converging portion which possesses, as a consequence of an electro-optic effect, a distribution of refractive index which permits the light beam passing through the part of the waveguide to be converged in a direction parallel to the surface of the substrate, and a second converging portion which possesses, as a consequence of an electro-optic effect, a distribution of refractive index which permits the light beam passing through the part of the waveguide to be converged in a direction of thickness of the substrate. The deflector portion is disposed between the first and second converging portions.

In one form of the above embodiment, the waveguide extends, in order, through the first converging portion, the deflector portion and the second converging portion, and terminates at an end face of the substrate. The substrate has another waveguide for receiving a light beam which is reflected from the recording medium toward the end face. The above-indicated another waveguide guides the reflected light beam to a light-sensitive element attached to a side face of the substrate.

BRIEF DESCRIPTION OF THE DRAWINGS

The above and additional objects, features and advantages of the present invention will become more apparent from reading the following detailed description of preferred embodiments of the invention, when considered in connection with the accompanying drawings, in which:

FIGS. 3 and 4 are views illustrating a distribution of refractive index of a first converging portion of the optical head of FIG. 1, and a light converging property of the first converging portion, respectively;

FIG. 5 illustrates a method of establishing the refractive index distribution of the first converging portion of FIG. 3;

FIG. 6 is a fragmentary elevational illustration showing an electric field produced at the first converging portion of FIG. 1;

FIGS. 9 and 10 are views showing a modification of the first converging portion of the embodiment of FIG. 1;

FIGS. 11(a) and 11(b) are a plan view and a side elevational view, respectively, showing a modified form of a second converging portion of the optical head of FIG. 1;

FIG. 12 is a view of a further modified form of the second converging portion of the embodiment of FIG. 1; and FIG. 13 is a fragmentary plan view of a further embodiment of the invention.

DETAILED DESCRIPTION OF THE PREFERRED EMBODIMENTS

The preferred embodiments of the present invention will be described in detail, referring to the accompanying drawings.

Figure 1:
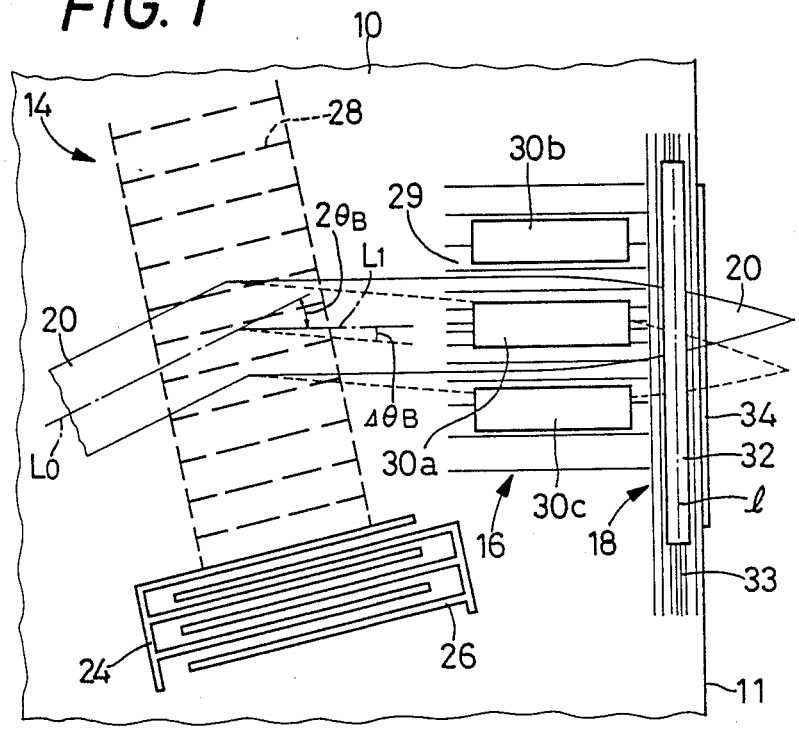
FIGS. 1 and 2 are a fragmentary plan view and a fragmentary side elevational view, respectively, of one embodiment of an optical head of the present invention.
Figure 2:
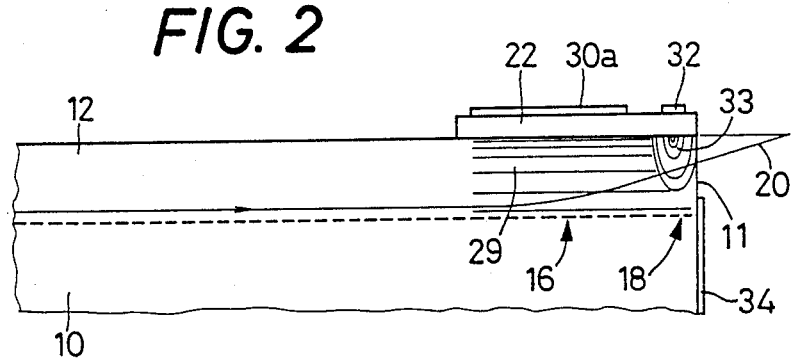

An optical had embodying the invention is shown in fragmentary plan and side elevational views of FIGS. 1 and 2. The optical head comprises a substrate 10 made of an electro-optic and acousto-optical material, for example, a single crystal of $LiNbO_3$. On one of the major opposite surfaces of the substrate 110, there is formed a waveguide 12, which is a layer formed adjacent to the surface of the substrate 10 by thermal diffusion of a suitable diffusion material such as Ti (titanium), so that the layer is given a refractive index higher than that of the substrate 10. The substrate 10 has a deflector portion 14 for deflecting a light beam passing through the waveguide 12, and a converging portion consisting of a first and a second converging portion 16, 18 for converging the deflected light beam. With this arrangement of the optical head, a laser beam 20 radiated from a suitable laser source (not shown) and guided by the waveguide 12 is emitted from an end face 11 of the substrate 10 such that the emitted light is focused on a predetermined point on a currently selected track of an optical recording medium such as an optical or magneto-optical recording disk. As indicated above, the layer constituting the waveguide 12 is formed as an integral part of the substrate 10, and the refractive index is varied continuously across the interface or boundary of the substrate 10 and the waveguide layer 12. The boundary is indicated in broken line in FIG. 2.

At one end of the deflector portion 14, there are provided a pair of deflection electrodes in the form of comb-like electrodes 24, 26 which are fixed on the surface of the substrate 10. By applying of a voltage between the comb-like electrodes 24, 26 under the control of a tracking controller (not shown), a portion of the substrate 10 between the comb-like electrodes 24, 26 is oscillated, whereby elastic surface waves 28 are generated. Thus, the comb-like electrodes 24, 28 cooperate with the above-indicated portion of the substrate 10 to constitute an oscillator to generate the elastic surface waves 28. As a result, the refractive index of a part of the waveguide 12 exposed to the elastic surface waves 28 is periodically varied in a direction intersecting an optical axis Lo of the laser beam 20, whereby the laser beam 20 is diffracted at the above-indicated part of the waveguide 12, in accordance with the Bragg diffraction principle. Described in more detail, the part of the waveguide 12 corresponding to the deflector portion 14 is given a distribution of refractive index in the direction of propagation of the elastic surface waves 28, which distribution is expressed by the following formula (1):

$$n(x, t) = N + \Delta n \sin(\Omega t - kx) \quad (1)$$

where, $k = 2\pi/\Lambda$ x: direction of propagation of elastic waves 28

$\Omega$: angular frequency of elastic waves 28

$\lambda$: wavelength of laser beam 20 n: refractive index of waveguide 12

$\Lambda$: wavelength of elastic waves 28

Further, an angle $2\theta_B$ of Bragg diffraction of the laser beam 20 is obtained from the following formula (2):

$$2\theta_B = \lambda/n\Lambda \quad (2)$$

If the frequency of the elastic surface waves 28 is varied by $\Delta f$ by the tracking controller, the laser beam 20 is deflected by an angle of $\Delta\theta_B$ according to the following formula (3):

$$\Delta\theta_B = \lambda \cdot \Delta f/v \quad (3)$$

where, v: propagation velocity of elastic waves 28
While the elastic surface waves 28 are not actually visible, they are indicated in FIG. 1 for ease of understanding.

A part of the waveguide 12 corresponding to the first converging portion 16 is formed on the substrate 10, by diffusion of Ti or other suitable diffusion material, such that the concentration of the diffused material increases in opposite directions toward and perpendicularly to an optical axis L1 of the laser beam 20 diffracted by the deflector portion 14. The first converging portion 16 comprises three first convergence electrodes 30a, 30b and 30c which are disposed on a buffer layer 22 on the substrate 10. The three electrodes 30a, 30b and 30c are spaced apart from each other in the direction perpendicular to the optical axis L1. In this arrangement of the first converging portion 16, the part of the waveguide 12 corresponding to the first converging portion 16 serves as a waveguide 29 which has a distribution of refractive index as shown in FIG. 3, in which the refractive index increases toward the center of the waveguide 29 (toward the optical axis L1). Consequently, the first converging portion 16 provides a light converging property as indicated in FIG. 4, i.e., an optical property to cause the laser beam 20 to be converged on the optical axis L1. In addition, the first converging portion 16 possesses a distribution of refractive index as a consequence of an electro-optic effect upon application of a voltage to the first convergence electrodes 30a, 30b, 30c, whereby the convergence of the laser beam 20 can be adjusted primarily in the direction parallel to the surface of the substrate 10. In this connection, it is noted that spaced-apart parallel straight lines at the first and second converging portions 16, 18 in FIGS. 1 through 3 indicate the distributions of the refractive index, which are not actually visible. The refractive index increases with an increase in the density of the straight lines. For example, such refractive index distributions may be established by vapor deposition of a diffusion material such as Ti as indicated at 31 in FIG. 5, and subsequent diffusion of the material 31 through the substrate 10.

When voltages are applied from a focusing controller (not shown) between the electrode 30a on the optical axis L1 and the electrode 30b, and between the electrode 30a and the electrode 30c, an electric field is produced, as indicated in FIG. 6 for illustrative purpose only. According to an electro-optic effect, the refractive index of the first converging portion 16 is higher at a portion 50a under the electrode 30a, than at portions 50b and 50c under the electrodes 30b, 30c. In other words, the refractive index increases toward the optical axis L1. Generally, an electro-optic material has a refractive index which is varied as a function of the magnitude of an electric field to which the photoelectric material is exposed. For instance, if the substrate 10 is made of LiNbO3, the refractive index n of the portion of the waveguide 29 located under the electrodes 30a, 30b, 30c is changed according to the following formula (4):

$$n = n_e - (\tfrac{1}{2})n_e^3 r_{33} \cdot E \quad (4)$$

where, $n_e$: refractive index of the substrate 10 with respect to abnormal light $r_{33}$: electro-optic constant of the substrate 10 in the direction of thickness Therefore, the light converging property of the first converging portion 16 is varied as the voltages applied to the electrodes 30a, 30b, 30c are changed, whereby the focal point of the laser beam 30 is adjusted.

A part of the waveguide 12 corresponding to the second converging portion 18 is formed on the substrate 10, by diffusion of Ti or other diffusion material such that the concentration of the diffused material increases in opposite directions toward a line l which is perpendicular to the optical axis L1 of the laser beam 20. The second converging portion 18 comprises two second convergence electrodes 32, 34 extending in parallel with respect to the line l. The electrode 32 is disposed on the top surface of the waveguide 12, more precisely, on the previously described buffer layer 22, and located adjacent to the end face 11 of the substrate 10. The electrode 34 is disposed on the end face 11 of the substrate 10. In this arrangement of the second converging portion 18, the part of the waveguide 12 corresponding to the second converging portion 18 serves as a waveguide 33 which has a refractive index that increases toward the line l as indicated in FIG. 2. Like a cylindrical lens (or semicylindrical lens), this waveguide 33 has a light converging property so as to converge the light in the direction of thickness of the substrate 10. In addition, the second converging portion 18 possesses a distribution of refractive index as a consequence of an electro-optic effect upon application of a voltage to the second convergence electrodes 32, 34, whereby the convergence of the laser beam 20 can be adjusted primarily in the direction of thickness of the substrate 10.

In the present embodiment of the optical head which has just been described, the laser beam 20 which is eventually emitted from the end face 11 of the substrate 10 is deflected at the deflector portion 14, by an angle corresponding to the frequency of voltages applied to the comb-like deflection electrodes 24, 26 under the control of the tracking controller. Further, the positions of the focal point of the emitted laser beam 20 are adjusted by the amounts determined by the levels of the voltages applied between the electrodes 30a and 30b and between the electrodes 30a and 30c, and between the electrodes 32 and 34, under the control of the focusing controller. Hence, the spot (focal point) of the emitted laser beam 30 can be aimed at a predetermined point on a target track of an optical recording medium, and can be caused to accurately follow possible variations in the position of the target track in the direction of the optical axis of the laser beam 20 and in the direction perpendicular to the optical axis. Thus, the present optical head is capable of controlling the emission of a light beam without using a device for moving an object lens along the optical axis, a tracking mirror and a device for actuating the tracking mirror, or a device for moving the object lens in the direction perpendicular to the optical axis. The elimination of these devices provides significant reduction in the size and weight of the optical head, which enables the optical head to record and read information on or from a selected track of an optical recording medium, with a shorter response to an access command and a higher speed of access of the beam spot to the appropriate recording track. Further, considerable reduction in the number of optical components incorporated in the optical head contributes to minimization of a loss of light energy within the optical system, and results in a reduced need for accurate alignment of the optical elements relative to each other, which leads to easier assembling of the optical head.

Modified embodiments of the invention will now be described. The same reference numerals as used in the preceding embodiment will be used in these modified embodiments to identify the corresponding elements, and no repeated description of these elements is provided in the interest of brevity.

Figure 7:
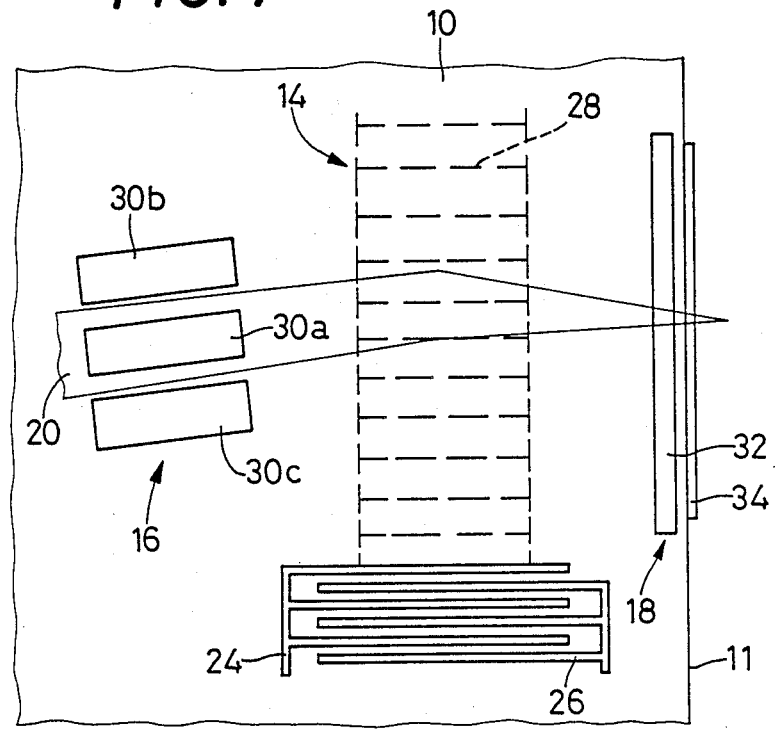
FIG. 7 is a view corresponding to FIG. 1, showing another embodiment of the invention.

The deflector portion 14 may be disposed between the first converging portion 16 and the second converging portion 18, as indicated in FIG. 7. This modified arrangement is free from an interference between an electric field produced by the first convergence electrodes 30a, 30b, 30c and the second convergence electrodes 32, 34, facilitating the focusing of the laser beam 20 by means of an electro-optic effect. This is an advantage of the present embodiment.

Figure 8:
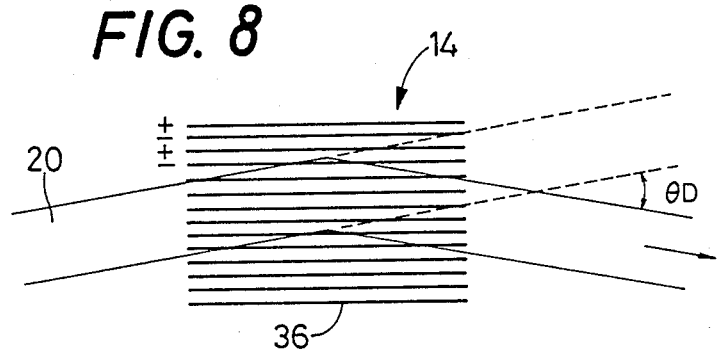
FIG. 8 is an illustration showing a modified form of a deflector portion of the optical head of FIG. 1.

As another modification, it is possible to utilize an electro-optic effect, rather than the elastic surface waves 28, for the deflector portion 14. Described more particularly, the deflector portion 14 may comprise a plurality of deflection electrodes 36 which are spaced from each other in a direction intersecting the optical axis Lo, as illustrated in FIG. 8. In this arrangement, a voltage is applied to each pair of the electrodes 36, so that a diffraction grating due to periodic variation in refractive index is established under the array of the electrodes 36. An angle $\theta_D$ of diffraction of the laser beam 20 by the diffraction grating is changed by varying the level of the voltages applied to the electrodes 36.

A modified form of the first converging portion 16 is illustrated in FIG. 9, which comprises a projection or ridge 38 which is formed on the surface of the substrate 10 such that the refractive index increases in the radial directions of the ridge 38, toward its center (toward the optical axis L1). In other words, the refractive index distribution is represented by concentric circles as viewed along the optical axis. Alternatively, the first converging portion 16 may be adapted such that a part of the waveguide 12 located under the central electrode 30a is given a refractive index distribution in the form of an ellipse as viewed along the optical axis L1, as indicated in FIG. 10, wherein the refractive index increases toward the center of the ellipse which is placed on the optical axis L1. The refractive index distributions as shown in FIGS. 9 and 10 may be established by ion bombardment.

The second converging portion 18 may be formed to have a refractive index distribution as indicted in FIGS. 11(a) and 11(b), which is represented by a semicircle as viewed along the optical axis L1.

Further, the second converging portion 18 may be formed by disposing two electrodes 40, 42 on a substrate made of a Y-cut crystal of LiNbO$_3$, as shown in FIG. 12, in order to control the convergence of the light beam in the direction of thickness of the substrate.

A further embodiment of the invention is illustrated in FIG. 13, wherein the substrate 10 has a waveguide 44 which extends through the first converging portion 16, the deflector portion 14 and the second converging portion 18, and terminates in the end face 11 of the substrate 10. In addition, the substrate 10 has a pair of waveguides 46, 46 which are adapted to receive at the end face 11 a light beam reflected from an optical recording medium, and to guide the received beam to light-sensitive elements attached to opposite side faces 48, 48 of the substrate 10.

While the present invention has been described in its preferred embodiments, it is to be understood that the invention may be otherwise embodied.

For example, the ultrasonic oscillator (comb-like electrodes 24, 26) of the deflector portion 14, which is controlled by a tracking controller, may be disposed at other locations, for example, on the side faces of the substrate 10. In this case, the substrate 10 need not be made of LiNbO$_3$.

While the deflector portion 14 is adapted to diffract the laser beam 20 according to Bragg diffraction, it is possible to utilize the principle of Raman-Nath diffraction.

Although the converging portion in the illustrated embodiments consists of the first and second converging portions 16, 18, the second converging portion may be eliminated if the convergence by the first converging portion is sufficient.

As previously described, the converging portions 16, 18 of the illustrated embodiments are given refractive index distributions established by diffusion of a suitable material, and the focal point of the light beam converged by these refractive index distributions is adjusted by changing the distributions by utilization of an electro-optic effect. However, the converging portions 16, 18 may be adapted to exhibit a refractive index distribution equivalent to that of a convex lens, by means of an electro-optic effect. In this case, it is not essential to give the converging portions a refractive index distribution by diffusion of a suitable material.

The previously indicated buffer layer 22 is a layer of several microns made of a transparent material such as SiO$_2$ having a lower refractive index than the material of the waveguide 12. The buffer layer 22 is provided for preventing the electrodes 30a, 30b, 30c from absorbing the energy of a light beam. However, the buffer layer 22 may be removed.

Further, it is noted that the shape and number of the electrodes of the converging portions 16, 18 are not confined to those of the illustrated embodiments.

It is to be understood that the forms of the present invention herein shown and described are to be taken as preferred examples of the same, and that various changes may be made within the scope of the invention defined in the appended claims.

What is claimed is:

1. An optical head for optical storage and readout of information on or from an optical recording medium using an emitted light beam, comprising:

a single substrate having a waveguide on one of its opposite surfaces;

a deflector portion, disposed on a first part of said waveguide and comprising a plurality of deflector electrodes, to deflect the light beam passing through said waveguide at an adjustable angle in response to an adjustable voltage applied across said plurality of deflector electrodes; and a converging portion comprising a first converging portion and a second converging portion which are disposed on a second part of said waveguide different from said first part, said first and second converging portions being operable to converge the light to be emitted from said waveguide in a first direction parallel to said one surface of the substrate and in a second direction parallel to a direction of thickness of said substrate, respectively;

said first converging portion including a plurality of first convergence electrodes disposed on a first section of said second par of the waveguide, said plurality of first convergence electrodes being spaced apart from each other in a direction perpendicular to a direction of propagation of the light beam through said first section of the waveguide, such that said first section possesses, as a consequence of an electro-optic effect produced upon application of an adjustable voltage across said plurality of first convergence electrodes, a distribution of refractive index which causes the light beam to be converged in said first direction;

said second converging portion including a plurality of second convergence electrodes disposed in parallel on a second section of said second part of the waveguide, said second section being adjacent to an end of said substrate medium, said plurality of second convergence electrodes extending perpendicularly to said direction of propagation, such that said second section possesses, as a consequence of an electro-optic effect produced upon application of an adjustable voltage across said plurality of second convergence electrodes, a distribution of refractive index which causes the light beam to be converged in said second direction, said plurality of second convergence electrodes including an electrode disposed on a top surface of said second section of said second part of the waveguide, and an electrode disposed on an end face of said second section from which the light beam is emitted.

2. An optical head according to claim 1, wherein said deflector portion comprises an oscillator which generates elastic surface waves to which said first part of said waveguide is exposed, so that a refractive index of said first part of the waveguide is periodically varied at a frequency corresponding to a frequency of said elastic surface waves, to diffract said light beam at a varying angle, whereby the angle of deflection of said light by said deflector portion is varied as the frequency of said elastic waves is changed.

3. An optical head according to claim 1, wherein said deflector portion comprises a plurality of deflection electrodes disposed on said first part of said waveguide, said deflection electrodes being spaced apart from each other such that said first part of the waveguide possesses, as a consequence of an electro-optic effect, a distribution of refractive index corresponding to a distribution of magnitude of an electric field produced by said deflection electrodes, said distribution of magnitude of said electric field being varied as a function of time, to thereby vary the angle of deflection of the light beam by said deflector portion.

4. An optical head according to claim 1, wherein said first section of said second part of the waveguide has a distribution of refractive index which permits the light beam to be converged at least in said first direction parallel to said one surface of the substrate, while said second section of said second part of the waveguide has a distribution of refractive index which causes the light beam to be converged in said second direction parallel to the direction of thickness of the substrate.

5. An optical head according to claim 4, wherein said first section of said second part of the waveguide is provided as a ridge formed on said one surface of the substrate.

6. An optical head for optical storage and readout of information on or from an optical recording medium using an emitted light beam, comprising:

a single substrate having a waveguide on one of its opposite surfaces;

a deflector portion, disposed on a first part of said waveguide and comprising a plurality of deflector electrodes, to deflect the light beam passing through said waveguide at an adjustable angle in response to an adjustable voltage applied across said plurality of deflector electrodes; and first and second converging portions which are respectively disposed on a second and a third part of said waveguide, said first part of said waveguide being disposed intermediate said second and third parts of said waveguide, said first and second converging portions including a plurality of first and second convergence electrodes, respectively, which are respectively spaced apart from each other in a direction perpendicular to a direction of propagation of said light beam through said second and third parts of the waveguide, such that said first converging portion possesses, as a consequence of an electro-optic effect, a distribution of refractive index which permits the light beam passing through said second part of the waveguide to be converged in a first direction parallel to said one surface of the substrate in response to an adjustable voltage applied across said plurality of first convergence electrodes, said second converging portion possessing, as a consequence of an electro-optic effect, a distribution of refractive index which permits the light beam passing through said third part of the waveguide to be converged in a second direction parallel to a direction of thickness of the substrate, in response to an adjustable voltage applied across said plurality of second convergence electrodes, whereby the light beam emitted from said third part of the waveguide is converged at an adjustable focal point with respect to said optical recording medium in said first and second directions.

7. An optical head according to claim 6, wherein said waveguide extends through said first converging portion, said deflector portion and said second converging portion in the order of description, and terminates at an end face of the substrate, said substrate having another waveguide for receiving a light beam which is reflected from said recording medium toward said end face, said another waveguide guiding the reflected light beam to a light-sensitive element attached to a side face of the substrate.

* * * * *